United States Patent [19]

Lawlis et al.

[11] 4,065,333
[45] Dec. 27, 1977

[54] FACING SHEET EDGE TRIMMING

[75] Inventors: John L. Lawlis, Roby; Bernard L. Rodgers, Rotan, both of Tex.; Daniel A. Winkowski, Tonawanda, N.Y.

[73] Assignee: National Gypsum Company, Buffalo, N.Y.

[21] Appl. No.: 783,155

[22] Filed: Mar. 31, 1977

[51] Int. Cl.² .................. B32B 30/04; B32B 31/00; B24B 1/00
[52] U.S. Cl. .................................... 156/40; 51/328; 156/154; 156/216; 156/250; 156/267; 156/268
[58] Field of Search ............... 156/153, 154, 216, 267, 156/250, 268, 487, 40; 51/328, 324

[56] References Cited

U.S. PATENT DOCUMENTS

| 2,056,450 | 10/1936 | Haberstump | 156/487 |
| 2,382,169 | 8/1945 | Pena | 156/154 |
| 2,748,046 | 5/1956 | Works et al. | 156/154 |

FOREIGN PATENT DOCUMENTS

| 449,578 | 9/1927 | Germany | 156/487 |

Primary Examiner—Douglas J. Drummond
Attorney, Agent, or Firm—Robert F. Hause

[57] ABSTRACT

Plastic sheet material, laminated to the front face and side edges of wallboard, having excess sheet width at each side edge, is uniformly and rapidly trimmed to a neat skived edge which becomes firmly adhered to the wallboard edge, by abrading through the sheet material with a rotary abrader such as a nylon brush.

5 Claims, 3 Drawing Figures

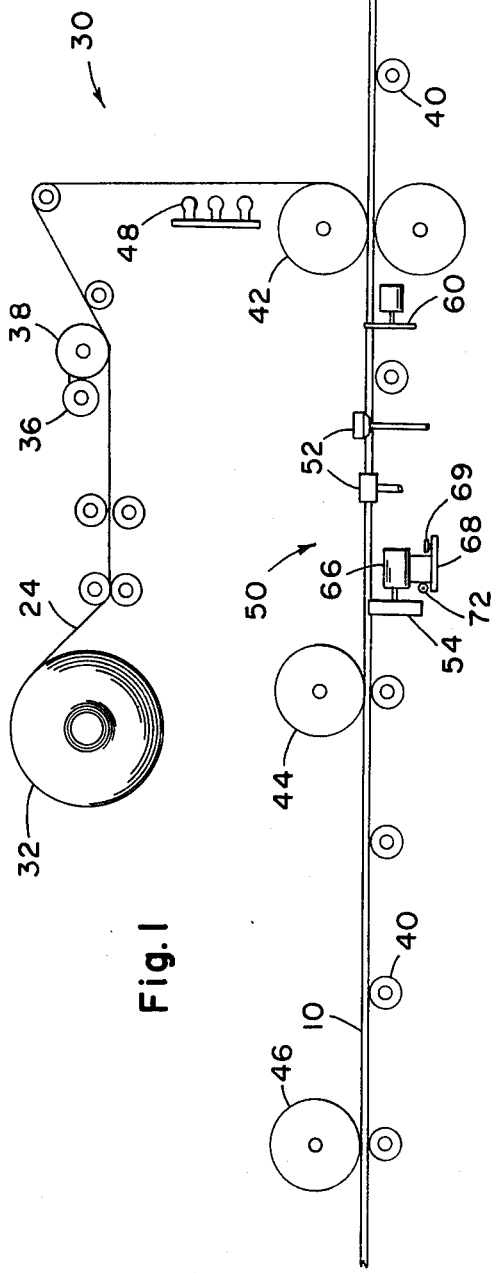
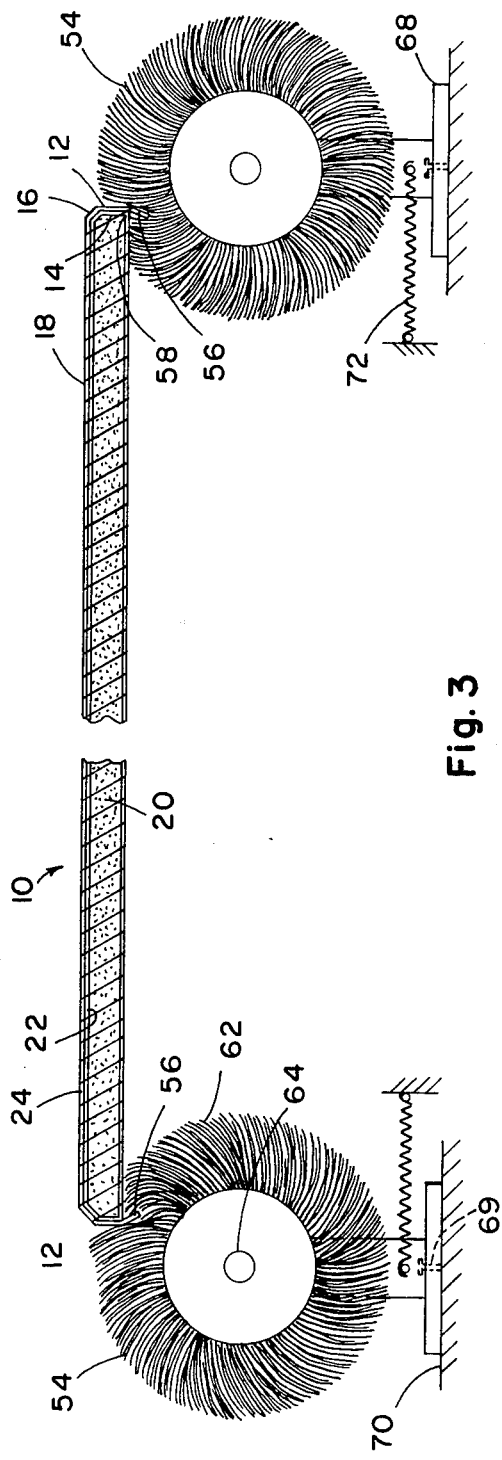

FACING SHEET EDGE TRIMMING

This invention relates to severing excess plastic sheet material along the edge of a plastic covered wallboard, and particularly to abrading, to sever, with a rotary brush.

Vinyl faced paper-covered gypsum wallboard is a known product, as disclosed in Hourigan et al U.S. Pat. No. 3,350,257. As disclosed in Hourigan et al, the vinyl plastic sheet laminated to the front face may be extended around onto each edge and terminated near the edge back corner.

In one form of manufacture of the boards, individual paper-covered gypsum wallboards are moved in a continuous row to where the continuous plastic sheet is applied to the face of the wallboards and wrapped around the edge front corner onto the edge. Frequently, adjacent individual boards, in the production line, will become out of line, one relative to the other, prior to applying the plastic sheet in the form of a continuous web, and a problem exists in applying the sheet uniformly to each wallboard. If the continuous web of plastic sheet is provided in the exact width desired to cover just the face and two side edges, the misaligned adjacent boards prevent the placing of the plastic sheet in the correct centered location on all boards.

The present invention provides a method and apparatus whereby a wider than necessary plastic sheet is applied, preferably as a continuous web to a succession of wallboards, to the face and two side edges of the wallboards, and the excess width is trimmed off by a rotary wheel having abrasive elements disposed to abrade through the plastic film along the back edge corner of the wallboard.

It is an object of the present invention to provide a method of uniformly trimming a plastic cover sheet along the back edge corner of a plastic covered wallboard.

It is a further object to provide apparatus for uniformly abrading a wallboard edge to remove the excess of a web of plastic thereon.

These and other objects and advantages of the invention will be more readily apparent when considered in relation to the preferred embodiments as set forth in the specification and shown in the drawings in which:

FIG. 1 is a schematic elevational view of the apparatus for applying a plastic cover sheet to wallboard in accordance with the invention.

FIG. 3 is an endwise cross-sectional view of the portion of apparatus of FIG. 2.

Figure 2:
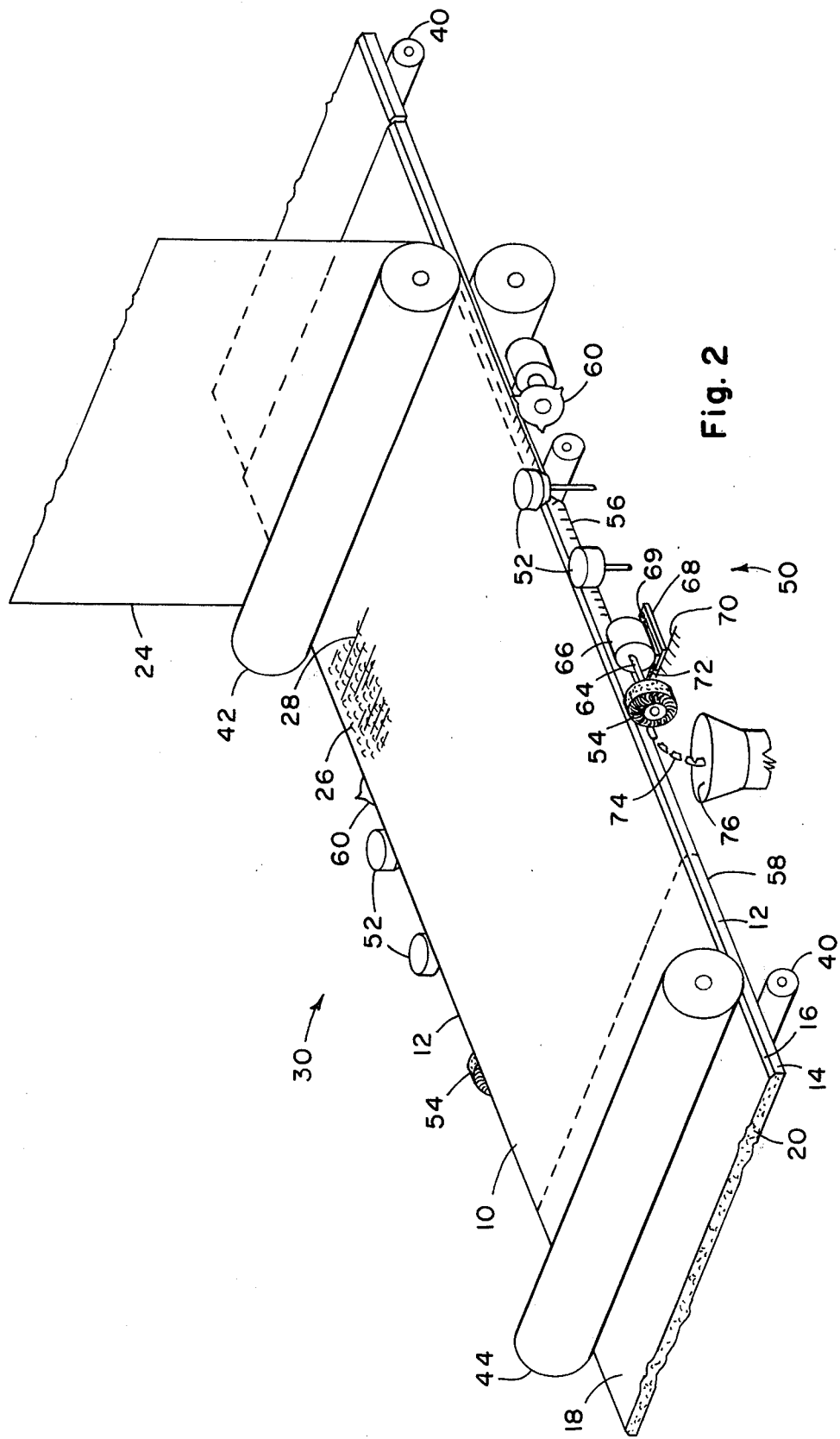
FIG. 2 is an isometric view of the portion of the apparatus of FIG. 1 whereat excess plastic sheet is being removed in accordance with the invention.

The wallboard produced by the method and apparatus is preferably similar to the plastic-sheet-covered gypsum wallboard disclosed in Hourigan et al U.S. Pat. No. 3,350,257; however, wallboards other than gypsum wallboards can be treated in accordance with the present invention, and plastic sheets having physical characteristics, such as stiffness, differing from the particular characteristics described in Hourigan et al can also be employed in the present invention. The disclosure of Hourigan et al, is embodied by reference herein, for additonal understanding of the present invention.

Referring to the drawings, wallboard 10 has side edges 12 each having a flat portion 14 and also a beveled portion 16 adjacent the front face 18. The board 10 has a gypsum core 20 enveloped in paper cover sheets 22.

A vinyl sheet 24, having embossments 26 and a printed design 28 thereon adhesively laminated to the paper cover sheets extending throughout the front face 18, the beveled edge portions 16 and the flat edge portions 14.

The paper cover sheets 22 and set gypsum core 20 are formed and the core set and dried in accordance with standard manufacturing procedure for gypsum wallboard. To apply the vinyl sheet 24 to the set and dried papercovered gypsum board, a laminating machine 30 is prepared for operation.

Machine 30 includes a supply roll 32 of vinyl sheet 24, adhesive gauging roller 36, adhesive applying roller 38, wallboard conveyor 40, a master roll 42, press rolls 44, 46, sheet edge heaters 48, and sheet edge adhering and trimming means 50.

Referring to FIG. 2, the sheet edge adhering and trimming means 50 will be seen to include on each edge a series of rollers 52 and a rotary nylon brush 54. The rollers 52 fold the edge portions of the vinyl sheet 24 down and against the paper 22 at the edges of the wallboard.

In accordance with the invention, the rotary nylon brushes 54, 54 are mounted suitably to be resiliently urged against the edges 12, 12, immediately after rollers 52 have folded the edge portions of the vinyl sheet 24.

Rollers 52 can be replaced with any of several rubbing means for directing the edge of the vinyl into proper folded form, such as by slowly rotating brushes.

The nylon brushes 54, 54 may also be replaced by other abrading means as will be discussed further below.

The vinyl sheet 24 as provided on supply roll 32 has a width which is greater than the combined width of the wallboard face 18 plus the two edges 12, 12. The vinyl sheet 24 is adhered to the wallboard paper surface with this excess width providing excess vinyl sheet 56 along each edge, extending below the wallboard back edge corner 58.

In the preferred form of the invention, an edge slitter 60 is disposed adjacent each edge of the vinyl sheet 24 between the master roll 42 and the rollers 52. Each edge slitter 60 has a slowly rotating rotary blade with at least one knife edge protruding therefrom, which forms a plurality of slits in the edge of the vinyl sheet 24, extending perpendicularly to the edge. These slits may be arranged at about three centimeter spacings therealong, and extend in a sufficient distance such that the slits go beyond the width of the excess vinyl sheet 56.

The rotary nylon brushes 54, 54 are preferably of about fifteen cm diameter, and about five cm width. They are comprised of a plurality of wear-resistant bristles 62, preferably of nylon, of about 0.03 cm diameter. The bristles 62 rotate about an axis 64 which extends generally parallel to the direction of movement of the wallboard 10 along the conveyor 40, which axis is slightly lower than the wallboard back edge corner 58, and which axis is close enough to the wallboard edge 12 so that the bristles are forcefully rubbed against the vinyl sheet 24 at the edge 12, as the wallboard moves past the brush 54. The bristles 62 are rubbed against the edge 12 moving from front face 18 toward the back.

The rotary brush 54 is driven by a motor 66, which is mounted on a base 68. Base 68 is pivotally mounted, at 69, on a floor or table 70, with spring means 72 urging the bristles 62 of brush 54 firmly against the vinyl sheet 24. Spring means 72 is adjusted to urge brush 54 against the vinyl sheet 24 with just sufficient force so that the abrasive action of the brush 54 against the vinyl sheet 24 results in severing the excess 56 from the wallboard 10.

With the preferred slitting step discussed above, the severed excess falls away from wallboard 10 in the form of a plurality of small vinyl chips 74. A vacuum inlet 76 disposed adjacent brush 54 gathers in all the chips 74.

The abrasive action of the rotary brush 54 is greatest along a line at the back edge corner 58, whereby it is along this line that the severing of the vinyl sheet 24 occurs. Immediately above the line of severing, the abrasive action is somewhat less and thus this portion of the vinyl sheet is only worn thin providing a desirable thin feather edge on the vinyl sheet. The action of the rotary brush also provides a very firm pressure on the feather edge portion to provide a very well adhered edge.

In place of the rotary nylon brushes 54, 54, there can be used other rotary abrading means having flexible abrading elements extending radially outward from a central hub. Examples of other rotary abraders that have performed satisfactorily are rotary wire brushes and central hubs having rectangular sandpaper sheets protruding therefrom of rectangular dimensions of about 5 cm width and 10 cm length extending radially.

Having completed a detailed disclosure of the preferred embodiments of our invention so that those skilled in the art may practice the same, we contemplate that variations may be made without departing from the essence of the invention or the scope of the appended claims.

We claim:

1. The method of making a plastic sheet covered wallboard with the plastic sheet extending uniformly from on one side edge of said wallboard across the face of said wallboard to onto the opposite side edge of said wallboard comprising the steps of laminating a thin plastic sheet onto the entire front face of a wallboard with side portions of said plastic sheet on each side having a width greater than the thickness of said wallboard at the edges, folding said plastic sheet side portions and adhering said plastic sheet side portions to the two side edges of said wallboard with an excess portion of said plastic sheet extending beyond the edge back corner on each side edge of said wallboard, trimming said excess portion from said plastic sheet covered wallboard, said trimming comprising the steps of disposing a rotary abrader having flexible abrading elements extending radially outwardly adjacent said edge back corner and rotating said rotary abrader with said abrader periphery engaging said plastic sheet at said edge back corner with a motion relative to the board edge in a direction from the front face toward the back edge corner, abrading said plastic sheet with said abrader with sufficient force to penetrate said plastic sheet, and moving said wallboard relative to said rotary abrader to provide said abrading action progressively along the full length of said edge back corner, whereby said abrading severs said excess portion from said wallboard.

2. The method of claim 1 wherein said excess portion is slit into a plurality of segments before being trimmed from said wallboard.

3. The method of claim 1 wherein said abrader is a rotary brush.

4. The method of claim 2 herein said brush is made of nylon fibers.

5. The method of claim 1 wherein said rotary abrader is urged against said plastic sheet by springs engaging the rotary abrader drive means, and said plastic sheet is applied to a succession of wallboards as a continuous plastic web.

* * * * *